(12) United States Patent
Freisler

(10) Patent No.: US 11,491,939 B2
(45) Date of Patent: Nov. 8, 2022

(54) VEHICLE OCCUPANT RESTRAINT SYSTEM AND METHOD FOR OPERATING A VEHICLE OCCUPANT RESTRAINT SYSTEM

(71) Applicant: ZF AUTOMOTIVE GERMANY GMBH, Aldorf (DE)

(72) Inventor: Werner Freisler, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/265,222

(22) PCT Filed: Aug. 1, 2019

(86) PCT No.: PCT/EP2019/070810
§ 371 (c)(1),
(2) Date: Feb. 2, 2021

(87) PCT Pub. No.: WO2020/025765
PCT Pub. Date: Feb. 6, 2020

(65) Prior Publication Data
US 2021/0347322 A1 Nov. 11, 2021

(30) Foreign Application Priority Data
Aug. 3, 2018 (DE) ...................... 10 2018 118 903.6

(51) Int. Cl.
*B60R 21/015* (2006.01)
*B60R 21/206* (2011.01)
(Continued)

(52) U.S. Cl.
CPC .. *B60R 21/01512* (2014.10); *B60R 21/01554* (2014.10); *B60R 21/206* (2013.01);
(Continued)

(58) Field of Classification Search
CPC ............ B60R 21/231; B60R 21/01512; B60R 21/01554; B60R 21/04; B60R 21/015;
(Continued)

(56) References Cited

U.S. PATENT DOCUMENTS 9,061,646 B2 * 6/2015 Abele ................... B60R 21/206
2004/0113399 A1 * 6/2004 Yoshikawa ........... B60R 21/231
280/752

(Continued)

FOREIGN PATENT DOCUMENTS

DE 19628837 A1 1/1997
DE 19727598 A1 1/1999
(Continued)

OTHER PUBLICATIONS

International Search Report for corresponding International Application Serial No. PCT/EP2019/070810, dated Oct. 10, 2019, pp. 1-6.

*Primary Examiner* — Keith J Frisby
(74) *Attorney, Agent, or Firm* — Tarolli, Sundheim, Covell & Tummino LLP

(57) ABSTRACT

The invention describes a vehicle occupant restraint system (2) comprising a control unit and at least two restraint elements (8, 10) for the protection of lower extremities (6, 6', 7, 7') in the area of a footwell (4) of a vehicle of a vehicle occupant seated in a particular vehicle seat of the vehicle, wherein a first restraint element (8) is configured as a knee airbag module (12), wherein a second restraint element (10) is provided for mounting into the footwell (4) of the vehicle, especially in an area of the footwell (4) of the vehicle arranged in the vehicle longitudinal direction (x) ahead of the knee airbag module (12), wherein, in a situation of restraint, the control unit can differentiate between different given situations, wherein the given situation can be determined via a vehicle seat position and parameters relating to (Continued)

vehicle occupants, wherein, in the situation of restraint, when a situation is given in which the vehicle seat (5) is in a position shifted backwards, especially in a position shifted backwards compared to the standard position, and the vehicle occupant is a short and/or light person, the control unit only activates the foot airbag module (16) of the second restraint element (10).

17 Claims, 8 Drawing Sheets

(51) Int. Cl.
  *B60R 21/231* (2011.01)
  *B60R 21/00* (2006.01)
  *B60R 21/01* (2006.01)
  *B60R 21/02* (2006.01)
(52) U.S. Cl.
  CPC .... *B60R 21/231* (2013.01); *B60R 2021/0032* (2013.01); *B60R 2021/0046* (2013.01); *B60R 2021/0051* (2013.01); *B60R 2021/0053* (2013.01); *B60R 2021/01034* (2013.01); *B60R 2021/01231* (2013.01); *B60R 2021/0213* (2013.01); *B60R 2021/23107* (2013.01); *B60R 2021/23169* (2013.01); *B60R 2021/23176* (2013.01)
(58) Field of Classification Search
  CPC .......... B60R 21/206; B60R 2021/0213; B60R 2021/024; B60R 2021/23169; B60R 2021/23176; B60R 2021/0046; B60R 2021/0051; B60R 2021/0407; B60R 2021/0032; B60R 2021/01034; B60R 2021/01231; B60R 2021/23107; B60R 2021/01211; B60R 2021/0053
  USPC .................. 280/730.1, 732, 734, 735, 743.2
  See application file for complete search history.

(56) References Cited

U.S. PATENT DOCUMENTS

| | | | | |
|---|---|---|---|---|
| 2014/0027574 | A1* | 1/2014 | Obadia | B64D 25/02 244/121 |
| 2015/0061268 | A1* | 3/2015 | Nagasawa | B60R 21/231 280/730.1 |

FOREIGN PATENT DOCUMENTS

| | | | | | |
|---|---|---|---|---|---|
| DE | 19818121 | A1 | * | 5/1999 | ........... B60N 2/3011 |
| DE | 10039661 | A1 | | 3/2001 | |
| DE | 102008063111 | A1 | | 8/2009 | |
| DE | 102014216472 | A1 | | 3/2015 | |
| DE | 102016121400 | A1 | | 6/2017 | |
| EP | 1431132 | A1 | | 6/2004 | |
| JP | H10310 | A | | 1/1998 | |
| JP | 2006151197 | A | * | 6/2006 | |
| JP | 2015085761 | A | * | 5/2015 | |
| WO | 1998/13226 | A1 | | 4/1998 | |
| WO | 2017/146847 | A1 | | 8/2017 | |

* cited by examiner

VEHICLE OCCUPANT RESTRAINT SYSTEM AND METHOD FOR OPERATING A VEHICLE OCCUPANT RESTRAINT SYSTEM

RELATED APPLICATIONS

The present invention is a U.S. National Stage under 35 USC 371 patent application, claiming priority to Serial No. PCT/EP2019/070810, filed on 1 Aug. 2019; which claims priority from 10 2018 118 903.6, filed 3 Aug. 2018, the entirety of both of which are incorporated herein by reference.

BACKGROUND OF THE INVENTION

The invention relates to a vehicle occupant restraint system comprising a control unit and at least two restraint elements for the protection of lower extremities in the area of a footwell of a vehicle of a vehicle occupant seated in a particular vehicle seat of the vehicle and to a method for operating the vehicle occupant restraint system according to the invention.

PRIOR ART

For protecting the lower extremities of a vehicle occupant in a situation of crash, in vehicles increasingly vehicle occupant restraint systems comprising especially knee airbag modules including knee airbags have been used in the area of the footwell. In a situation of crash, those knee airbags can both prevent the knee and/or the shin (tibia) of the vehicle occupant from directly impacting on an instrument panel and minimize the risk of vehicle occupants slipping under a seatbelt in the situation of restraint.

The progressive developments in the field of automated and autonomous driving may result in seat adjusting options for the vehicle occupants which are located beyond a standard position or a standard position range of the vehicle seat for which the existing vehicle occupant restraint systems are designed. In those comfort positions, the vehicle seat is especially in a position adjusted further backwards or in a position having a strongly reclined seat back.

This results in the fact that the positions of the vehicle occupants relative to the restraint systems usually tightly mounted on the vehicle structure such as especially airbags, may be variable during traveling and, as compared to the standard position range, the distances may be significantly increased depending on the situation. Further, the relative position of the vehicle occupants may thus deviate from the standard position such that restraint systems installed on the vehicle structure cannot or do not fully become effective.

SUMMARY OF THE INVENTION

Therefore, it is the object of the invention to provide an improved vehicle occupant restraint system for protecting the lower extremities of a vehicle occupant. In particular, it is the object of the invention to provide a vehicle occupant restraint system for protecting the lower extremities of a vehicle occupant by which the protective effect of the vehicle occupant restraint system can be improved irrespective of the relative position of the vehicle occupant.

Achieving the Object

The features according to the claims lead to achieving the object. Advantageous configurations are described in the subclaims.

Expressions of place such as "in front of" and "behind" as well as "upper" or "lower" relate to a vehicle longitudinal axis and, resp., vehicle vertical axis of a vehicle.

A vehicle occupant restraint system according to the invention is provided for protecting lower extremities of a vehicle occupant who is seated in a particular vehicle seat. The vehicle occupant restraint system according to the invention comprises at least two restraint elements and a control unit. The at least two restraint elements of the vehicle occupant restraint system are disposed, for the protection of the lower extremities of the vehicle occupant, in a state installed in the vehicle in the footwell or at least in the area of the footwell of the vehicle.

A first restraint element of the vehicle occupant restraint system according to the invention is in the form of a knee airbag module. The knee airbag module is disposed, in a typical embodiment in the state installed in the vehicle, in a lower area of the instrument panel. The knee airbag module may be configured especially as a so-called "low-mounted module" or "mid-mounted module".

A second restraint element of the vehicle occupant restraint system according to the invention is provided for being installed in the footwell. The second restraint element is disposed or, resp., mounted in the state installed in the vehicle especially in an area of the footwell located in front of the knee airbag module.

The second restraint element comprises at least one foot airbag module including a foot airbag. The foot airbag module can be especially configured as a partial element of the second restraint element.

The control unit of the vehicle occupant restraint system according to the invention can differentiate, in a situation of restraint, between different given situations.

The classification of the different situations by the control unit is based especially on parameters relating to vehicle occupants and/or on a position of the vehicle seat relative to the first and second restraint elements disposed in the area of the footwell.

Concerning the vehicle seat position, a distinction can especially be made between a standard position and a comfort position of the vehicle seat. The standard position describes a standard position of the vehicle seat for which restraint elements of a vehicle occupant restraint system fixedly arranged in the vehicle structure are designed. The comfort position describes especially a position of the vehicle seat in which the vehicle seat is shifted backwards and has a larger space from the restraint elements of the vehicle occupant restraint system than in the standard position.

The parameters relating to vehicle occupants may be especially the body weight and/or a body height and/or a position of the vehicle occupant in the vehicle seat. Further, the parameters relating to vehicle occupants may as well relate to a position of the lower extremities in the footwell of the vehicle.

In the vehicle occupant restraint system according to the invention, in a situation of restraint only the foot airbag module of the second restraint element is activated by the control unit, if the control unit detects a situation in which the vehicle occupant is a short and/or light person and the vehicle seat is in a position shifted backwards, especially in a position shifted backwards vis-à-vis the standard position.

In a situation in which the vehicle seat is in the standard position and/or the vehicle occupant is not a short and/or light person, in the situation of restraint, on the other hand, at least the knee airbag module (12) of the first restraint element (8) is activated by the control unit. Moreover, depending on the given situation, the second restraint element or a partial element of the second restraint element can additionally be activated by the control unit.

For this purpose, the vehicle occupant restraint system may include a control unit for controlling and activating the first and/or second restraint element(s). Preferably, the control unit of the vehicle occupant restraint system may be integrated in a vehicle control system, especially in an airbag control system. In particular, the control unit may be integrated in a vehicle control system by which further restraint systems can be additionally activated and controlled.

For determining the parameters relating to vehicle occupants and/or the relative position of the vehicle seat, the vehicle occupant restraint system can comprise at least one sensor element. Alternatively, or additionally, the control unit can access the sensor data of one or more sensor elements integrated in the vehicle. The sensor element may comprise a camera system, for example. Furthermore, the sensor element can include, e.g., one or more sensors integrated in vehicle seat elements. In addition, the control unit can preferably make also use of and/or access sensor data of further sensor elements arranged in the vehicle, especially in the footwell, for detecting the given situation.

The foot airbag module is preferably arranged in the lower area of the instrument panel in the vehicle longitudinal direction ahead of the knee airbag module. Preferably, in a filled state, the foot airbag is arranged beneath and/or ahead of the foremost and lowest knee airbag chamber. The low-pressure chamber offers substantially the same advantages and properties as the low-pressure chamber of the knee airbag.

In typical embodiments of the vehicle occupant restraint system, the second restraint element moreover comprises a heel abutting point positioning module.

The heel abutting point can be adapted by the heel abutting point positioning module in the footwell of the vehicle in a restraint situation. In particular, the heel abutting point can be shifted by the heel abutting point positioning module backwards in the vehicle longitudinal direction and thus toward the vehicle occupant. By displacing the heel abutting point toward the vehicle occupant, in a situation of restraint a forward movement of the lower extremities in the area of the foot can be limited at an early stage, for example. By limiting the movement of the foot, e.g., the contact of the lower extremities, especially of the knee and the shin, with the knee airbag can be improved. Furthermore, this helps reduce, for example, the risk of the shin and the foot swinging upwards and rebounding from the knee airbag. Moreover, for example, the risk of the shin and the foot swinging upwards and passing under the knee airbag can be reduced. The heel abutting point is shifted and positioned preferably by lifting the vehicle floor and/or the vehicle floor lining in the area of the heel abutting point positioning module. The heel abutting point may especially be an elevation or an edge in the area of the vehicle floor by which a forward movement of the foot can be inhibited and/or stopped especially in a situation of restraint.

Preferably, the heel abutting point positioning module is arranged, in the mounted state in the footwell of the vehicle, in a transition area between the vehicle floor and a front wall delimiting the footwell. The front wall delimiting the footwell may be, for example, the bulkhead of the vehicle. Upon activation of the heel abutting point positioning module, the heel abutting point can be formed especially by a change of contour of the vehicle floor and/or of the lining of the vehicle floor.

The heel abutting point positioning module can comprise an airbag module for displacing and positioning the heel abutting point. Upon activation of the airbag module, especially the lining of the vehicle floor can be lifted by filling the airbag of the airbag module and, thus, the heel abutting point can be shifted. The airbag of such heel abutting point positioning module usually has a slower fill rate, for example vis-à-vis a knee airbag. The slower filling of the airbag of the heel abutting point positioning module helps avoid high loads of the foot, for example.

As an alternative, the heel abutting point positioning module may comprise a deformation element. The deformation element is preferably disposed between the vehicle floor and/or the front wall delimiting the footwell and the lining of the vehicle floor.

In one embodiment, the deformation element is configured as a bistable spring element. Upon activation by the control unit, the bistable spring element can be excited, for instance through an actuator, to change its shape from a first stable position to a second position.

In another embodiment, the deformation element comprises a foamable element. The foamable element is made from a material that will foam by excitation and will increase its volume. Upon activation of the heel abutting point positioning module by the control unit, said foaming process of the foamable element is started by an appropriate actuator. In this way, e.g., the lining of the vehicle floor is lifted and the heel abutting point is shifted toward the vehicle occupant.

It may further be provided that the heel abutting point positioning module is configured so that the positioning and thus the shift of the heel abutting point backwards toward the vehicle occupant takes place such that it is completed before the foot impacts on the heel abutting point positioning module. This, too, helps avoid high loads of the foot.

In particular, the second restraint element may comprise especially both a heel abutting point positioning module and a foot airbag module. Each of the heel abutting point positioning module and the foot airbag module in such embodiment constitutes a partial element of the second restraint element. In particular, the foot airbag module and the heel abutting point positioning module can be activated independently of each other by the control unit in the situation of restraint, in response to the given situation.

The knee airbag of the knee airbag module of the first restraint element preferably comprises at least one adaptive chamber. The knee airbag may comprise a pressure-adaptive chamber or a depth-adaptive chamber. Alternatively, the knee airbag may comprise a pressure-adaptive chamber and a depth-adaptive chamber. In one embodiment, such adaptive chamber of the knee airbag can be activatable and/or controllable through the control unit.

In a typical embodiment, in a filled state of the knee airbag, the chamber of the knee airbag that is foremost and/or lowest in the vehicle longitudinal direction and, resp., in the vehicle vertical direction is configured as a pressure-adaptive chamber of the knee airbag.

The pressure-adaptive chamber is preferably configured as a low-pressure chamber. The term low-pressure chamber can either describe that the pressure-adaptive chamber in a filled state has a lower internal pressure than the further chamber or, resp., the further chambers of the knee airbag. Alternatively, the term low-pressure chamber can describe that the pressure-adaptive chamber requires a significantly longer period of time until it is completely filled. In such embodiment, in a situation of restraint the low-pressure chamber is not completely filled when the shin (tibia) and/or the foot are/is impacting, and, thus, at the time of impacting it has a lower internal pressure than the further chamber or further chambers of the knee airbag which is/are substantially completely filled at said point in time. The lower internal pressure of the low-pressure chamber helps reduce the risk, for example, of the shin and the foot being rebounded after impacting on the low-pressure chamber of the knee airbag.

The pressure-adaptive chamber can be configured, in one embodiment, such that the pressure-adaptive chamber can be filled in a situation of restraint, independently of the given situation. In particular, the pressure-adaptive chamber in such embodiment can be configured as a low-pressure chamber that is filled more slowly than the further chamber or the further chambers of the knee airbag by restriction of the flow of the fill gas, for example. It is also imaginable that an inflow orifice or an overflow orifice toward the pressure-adaptive chamber is closed by appropriate means in the event of a specific expansion or a specific internal pressure of the pressure-adaptive chamber.

Alternatively, in one embodiment, the pressure-adaptive chamber can be activated and, resp., controlled by the control unit. In particular, in such embodiment, the pressure-adaptive chamber can be filled in response to the given situation. For example, filling of the pressure-adaptive chamber can be carried out by an opening toward the pressure-adaptive chamber being released via a valve or a valve-like member.

In one embodiment, the knee airbag of the knee airbag module may be configured without a pressure-adaptive chamber. Preferably, the second restraint element in such embodiment comprises the foot airbag module.

The foot airbag of the foot airbag module may comprise a low-pressure chamber or may be configured as a low-pressure chamber. The low-pressure chamber offers substantially the same advantages and properties as the low-pressure chamber of the knee airbag.

Especially a chamber of the knee airbag that is closest to the vehicle occupant can be configured as a depth-adaptive chamber of the knee airbag, based on a filled state of the knee airbag. A depth-adaptive chamber can help increase especially an expansion of the knee airbag in the vehicle longitudinal direction. For example, in a comfort position of the vehicle seat, a space between the knee of the vehicle occupant and the filled knee airbag can thus be reduced. The higher expansion in the vehicle longitudinal direction and the space from the lower extremities of the vehicle occupant reduced in this way can help limit the forward movement of the vehicle occupant, for example, at an earlier stage in a situation of restraint.

Moreover, a depth-adaptive chamber can be arranged in the lower area of the knee airbag that faces the vehicle occupant's shin in the filled state. By such configuration, especially the expansion of the knee airbag in the direction of the vehicle occupant's shin is increased. Thus, for example, the shin and the foot can be prevented or at least restricted from swinging upwards.

Another substantial aspect of the invention is a method for operating the vehicle occupant restraint system according to the invention. The method comprises at least the following steps of:
  detecting and determining a position of the vehicle seat and/or parameters relating to vehicle occupants;
  determining the given situation by the control unit;
  activating the restraint elements required for restraint in the given situation.

Depending on the embodiment, in the method according to the invention the position of the vehicle seat can be determined through at least one sensor element. Alternatively, parameters relating to vehicle occupants can be determined through at least one sensor element. In another preferred embodiment, the position of the vehicle seat and parameters relating to vehicle occupants are determined through sensor elements.

When detecting the parameters relating to vehicle occupants, especially a body weight and/or a body height and/or a position of the vehicle occupant in the vehicle seat can be determined. Further, also the position of the lower extremities in the area of the footwell can be determined, for example.

Detecting and determining the position of the vehicle seat and/or the parameters relating to vehicle occupants can be continuously carried out by the control unit. As an alternative, the position of the vehicle seat and/or the parameters relating to vehicle occupants can be detected and determined at fixed intervals. Furthermore, the position of the vehicle seat and/or the parameters relating to vehicle occupants can be detected and determined as late as when a situation of restraint is given or immediately before a situation of restraint will occur.

The control unit can determine the presence of a particular situation through said sensor data concerning the position of the vehicle seat and/or the parameters relating to vehicle occupants detected by the sensor elements.

The control unit can differentiate between at least two situations. Preferably, the control unit can differentiate between at least four different situations.

Especially, when the given situation is determined, it can be decisive whether the vehicle seat is in a standard position or in a comfort position. It can further be decisive whether the vehicle seat accommodates a person whose body height and/or body weight is within the range of a 5%-person, or a person whose body height and/or body weight is within the range or above the range of a 50%-person. The reference values for the 5%-person and the 50%-person in this case are rated to be the weight and the height of 5%- and 50%-dummies of the hybrid-III family used in crash tests. The 50%-dummy ("HIII 50% Middle Adult Male") has a body height of 175 cm and a weight of 78 kg, and the 5%-dummy ("HIII 5% Small Adult Female") has a body height of 152 cm and a weight of 54 kg.

The value defining the transition between the 5%-person and the 50%-person is preferably fixed on the basis of the reference values of the 5%-person or the 50%-person. For example, it can be preset to the control unit that a 5%-person is to be assumed up to a body height and/or a body weight that is 10% above the reference value of the 5%-person. Alternatively, it can be preset to the control unit, for example, that a 50%-person is to be assumed from a body height and/or a body weight that is 10% below the reference value of the 50%-person, and that a 5%-person is to be assumed in the case of body heights and/or body weights which are lower than that. These deviation values defining the exact transition range can be adapted to the respective vehicle occupant restraint system by those skilled in the art for each specific vehicle.

In one embodiment, the control unit of the vehicle occupant restraint system can differentiate, e.g., between the following four possible situations:
  First situation: the position of the vehicle seat is in a standard position, and a person whose body height and/or body weight is/are within the range of or above a 50%-person is seated in the vehicle seat.

Second situation: the position of the vehicle seat is in a standard position, and a person whose body height and/or body weight is/are in the range of a 5%-person is seated in the vehicle seat.

Third situation: the position of the vehicle seat is in a comfort position, and a person whose body height and/or body weight is/are in the range of or above a 50%-person is seated in the vehicle seat.

Fourth situation: the position of the vehicle seat is in a comfort position in which the vehicle seat is shifted backwards vis-à-vis the standard position, and a person whose body height and/or body weight is/are in the range of a 5%-person is seated in the vehicle seat.

In such embodiment, the control unit can activate the restraint elements of the vehicle occupant restraint system as explained in the following, for example. The example is shown by way of a vehicle occupant restraint system which, as a first restraint element, comprises a knee airbag module including a knee airbag with an active depth-adaptive chamber and, as a second restraint element, comprises a foot airbag module and a heel abutting point positioning module.

In the first situation, only the knee airbag module of the first restraint element is activated by the control unit.

When the second situation is given, the control unit activates the knee airbag module and additionally the heel abutting point positioning module.

When the third situation is given, the control unit activates the knee airbag module. Furthermore, the control unit releases a tether, for example, in the knee airbag module so that the depth-adaptive chamber can be completely filled. In addition, the control unit activates the heel abutting point positioning module.

In the fourth situation, only the foot airbag module is activated. In this situation, the shins and the feet of the vehicle occupant swing upwards and impact on the foot airbag of the foot airbag module, especially on a low-pressure chamber of the foot airbag. The low-pressure chamber enables the lower extremities of the vehicle occupant to be absorbed without being rebounded.

In an alternative embodiment of the vehicle occupant restraint system according to the invention, in addition to the foot airbag module the knee airbag module can be activated by the control unit, when the fourth situation is given.

In another embodiment, the knee airbag may include a pressure-adaptive chamber in the form of a low-pressure chamber. In such embodiment, it may be provided, for example, that, when the fourth situation is given, only the knee airbag module is activated by the control unit. Alternatively, in such embodiment, when the fourth situation is given, both the knee airbag module and the foot airbag module can be activated in the situation of restraint.

The afore-described method steps are embodiments which are not limiting. Those skilled in the art may adapt the method according to the invention, in line with the teaching of the present invention for a specific vehicle and depending on the existing sensor elements and the seat adjusting options, to further embodiments of the vehicle occupant restraint system according to the invention.

BRIEF DESCRIPTION OF THE DRAWINGS

Further advantages, features and details of the invention will be evident from the following description of an example embodiment that is understood to be not limiting as well as by way of the drawings, wherein.

DESCRIPTION

Figure 1:
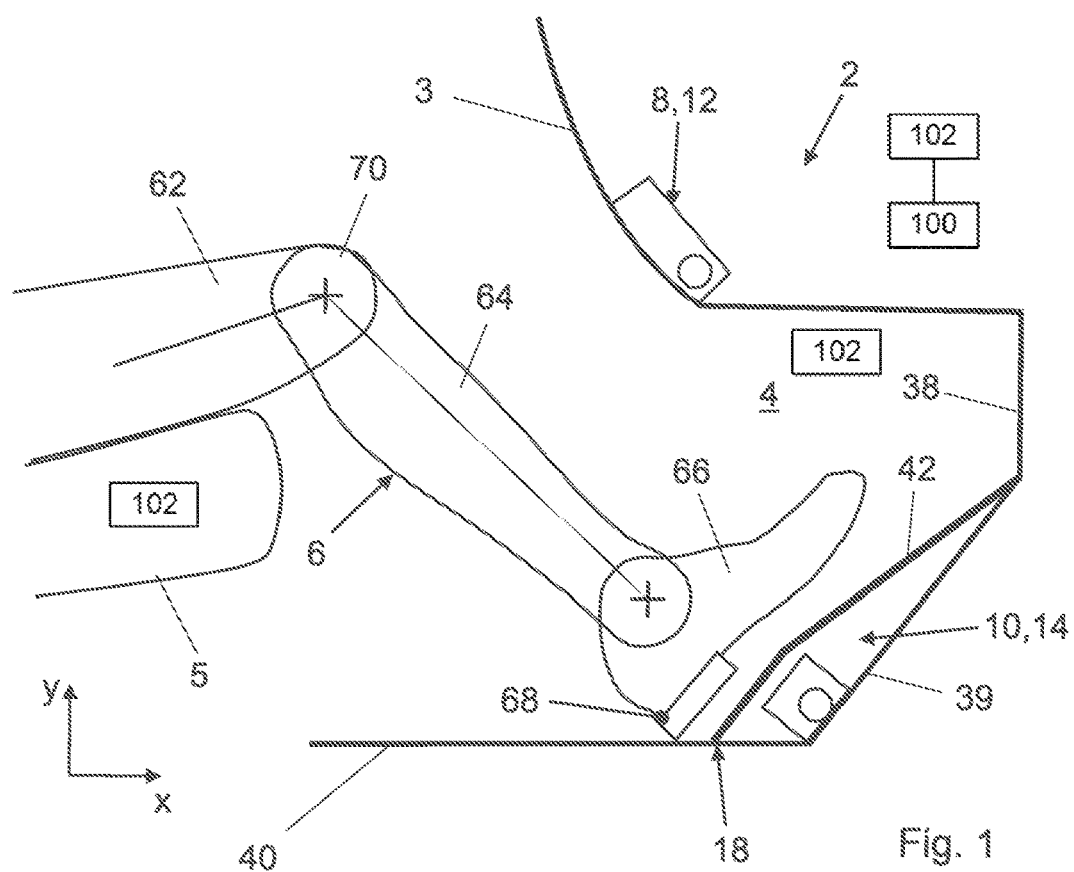
FIG. 1 shows a schematic view of the footwell of a vehicle with an embodiment of a vehicle occupant restraint system according to the invention and lower extremities of a 50%-person in a standard position.

FIG. 1 schematically illustrates a footwell 4 of a vehicle including a vehicle occupant protection restraint system 2.

The vehicle occupant restraint system 2 is shown in FIG. 1 in a non-activated state. The vehicle occupant protection restraint system 2 is configured for protecting the lower extremities 6 of a vehicle occupant. The lower extremities comprise, inter alia, the thigh 62, the knee 70, the lower leg with the shin (tibia) 64 as well as the foot 66 with the heel 68. The lower extremities 6 correspond, as to their dimensions, to the lower extremities 6 of a 50%-person. The lower extremities 6 are shown in a position in which the vehicle seat 5 is in a standard position. In FIG. 1, merely part of the seating area of the vehicle seat 5 is shown. The further Figures do without a representation of the vehicle seat 5 for reasons of clarity.

The vehicle occupant protection restraint system 2 has a first restraint element 8 that is in the form of a knee airbag module 12. The knee airbag module is arranged in a lower area of the instrument panel 3 in the vehicle vertical direction y. The vehicle occupant protection restraint system 2 further comprises a second restraint element 10. The second restraint element 10 is configured as a heel abutting point positioning module 14. The heel abutting point positioning module 14 is disposed in a transition area 39 between a vehicle floor 40 and a front wall 38 delimiting the footwell 4. The heel abutting point positioning module 14 is disposed beneath a vehicle floor lining 42. The vehicle floor lining 42 may be, for example, a vehicle carpet mounted in the footwell 4.

Figure 2:
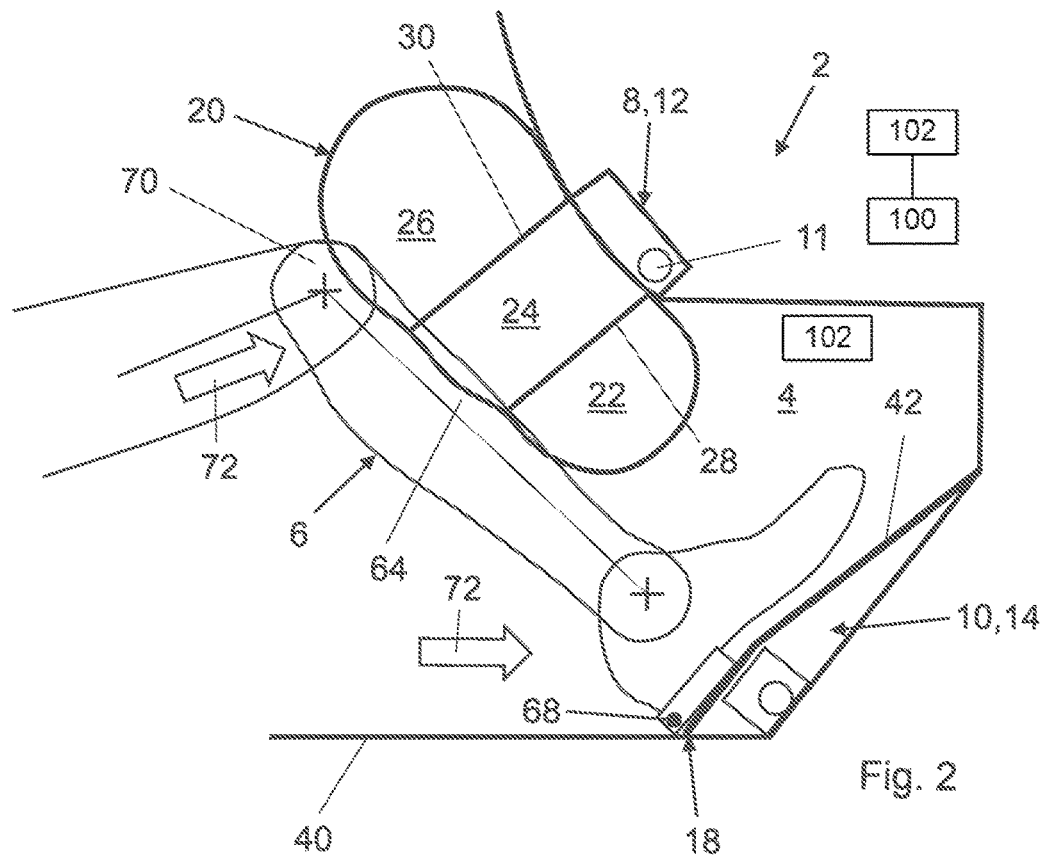
FIG. 2 shows a schematic view of the footwell with the vehicle occupant restraint system according to FIG. 1 in an activated state.

FIG. 2 illustrates the vehicle occupant restraint system 2 in an activated state in a situation of restraint in which a 50%-person is seated in the vehicle seat in a standard position. In the shown embodiment, only the knee airbag module 12 of the first restraint element 8 is activated by the control unit 100 of the vehicle occupant restraint system 2. The knee airbag 20 of the knee airbag module 12 in the shown embodiment comprises plural chambers 22, 24, 26 which are separated, for example, by tethers 28 and 30. After activation of the knee airbag module 12, the knee airbag 20 is filled with gas by a gas generator 11. The lowest chamber 22 in the vehicle longitudinal direction x of the knee airbag 20 is configured as a pressure-adaptive low-pressure chamber 22. The low-pressure chamber 22 has a lower internal pressure than the two chambers 24 and 26 at the illustrated point in time at which the knee 70 and the shin 64 impact on the knee airbag 20. A forward movement 72 of the lower extremities 6 is limited, on the one hand, by the heel abutting point 18. The heel abutting point 18 is arranged in the transition area 39 between the vehicle floor 40 and the front wall 38 delimiting the footwell 4 and limits the forward movement of the foot 66. On the other hand, the forward movement 72 of the lower extremities 6 is limited by the knee airbag 20.

Figure 3:
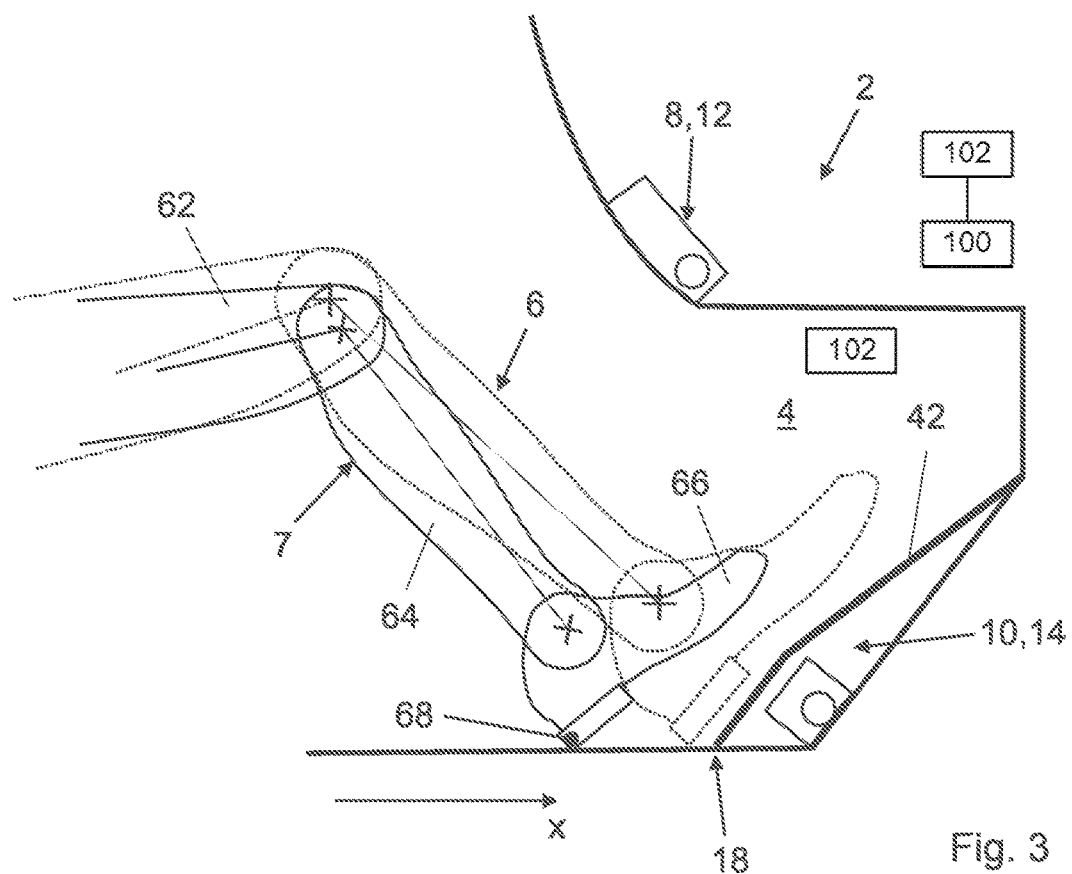
FIG. 3 shows a schematic view of the footwell with the vehicle occupant restraint system according to FIG. 1 with lower extremities of a 5%-person in a standard position.

FIG. 3 illustrates the footwell 4 with the lower extremities 7 of a 5%-person who is seated in a vehicle seat in the standard position. Further, in dotted lines the lower extremities 6 of a 50%-person are shown. It is evident from the comparison of the lower extremities 7 of the 5%-person and the lower extremities 6 that especially the foot 66 of a 5%-person is further behind in the travel direction x. Consequently, a space between the heel 68 of the 5%-person and the heel abutting point 18 is significantly increased as compared to the space with the 50%-person.

Figure 4:
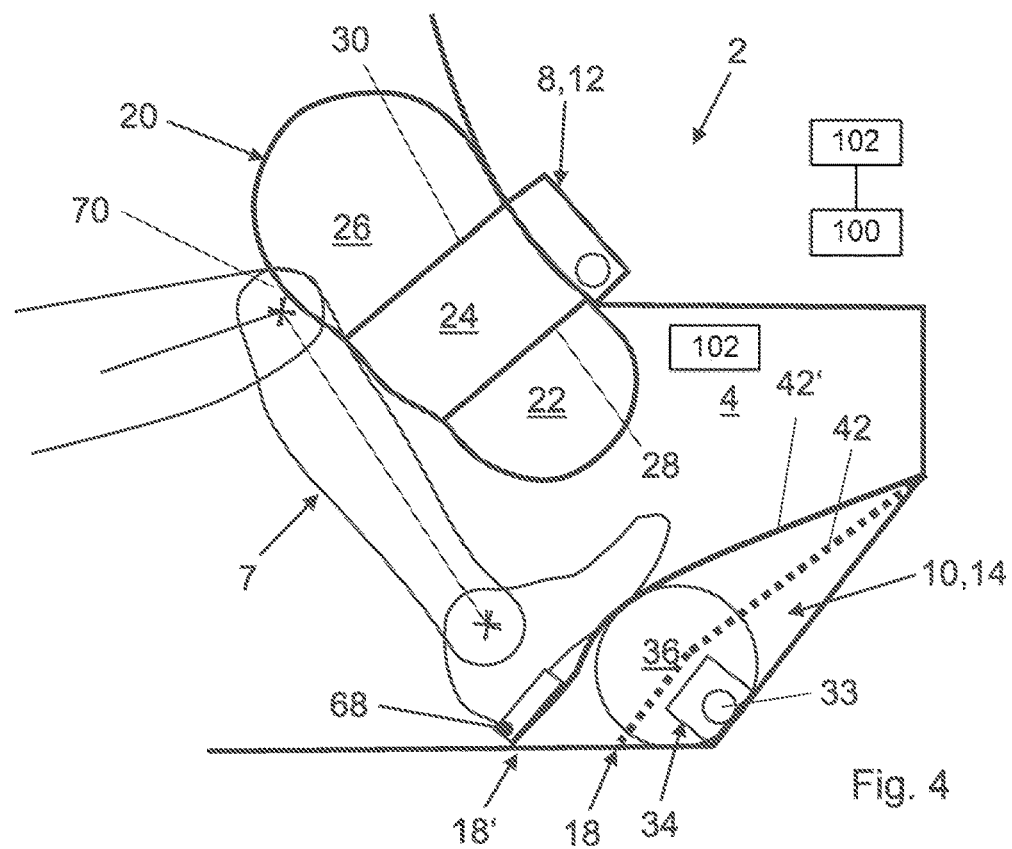
FIG. 4 shows a schematic view of the footwell with the vehicle occupant restraint system according to FIG. 3 in an activated state.

As is shown in FIG. 4, in a situation of restraint, apart from the knee airbag module 12 of the first restraint element 8, also the heel abutting point positioning module 14 is activated. In the shown embodiment, the heel abutting point positioning module 14 comprises an airbag module 34 including a gas generator 33 and an airbag 36. By filling the airbag 36 the vehicle floor lining 42 is shifted to the position marked with 42'. In addition, the heel abutting point 18 is thus shifted backwards in the vehicle longitudinal direction x toward the foot 66 of the 5%-person to the position marked with 18'.

The vehicle occupant restraint system may include a control unit 100 for controlling and activating the first and/or second restraint element(s). The control unit 100 of the vehicle occupant restraint system may be integrated in a vehicle control system, especially in an airbag control system. In particular, the control unit 100 may be integrated in a vehicle control system by which further restraint systems can be additionally activated and controlled.

For determining the parameters relating to vehicle occupants and/or the relative position of the vehicle seat, the vehicle occupant restraint system can comprise at least one sensor element 102. Alternatively, or additionally, the control unit 100 can access the sensor data of one or more sensor elements 102 integrated in the vehicle. The sensor element 102 may comprise a camera system, for example. Furthermore, the sensor element 102 can include, e.g., one or more sensors integrated in vehicle seat elements. In addition, the control unit 100 can preferably make also use of and/or access sensor data of further sensor elements arranged in the vehicle, especially in the footwell, for detecting the given situation.

By displacing the heel abutting point 18 to the position marked with 18', the forward movement of the foot 66 is limited at an early stage in the situation of restraint, which allows to optimize especially the immersion of the knee 70 and the shin 64 into the knee airbag of the 5%-person. In addition, the shift of the heel abutting point 18 to the position marked with 18' prevents the foot 66 and the shin 64 from swinging upwards.

Figure 5:
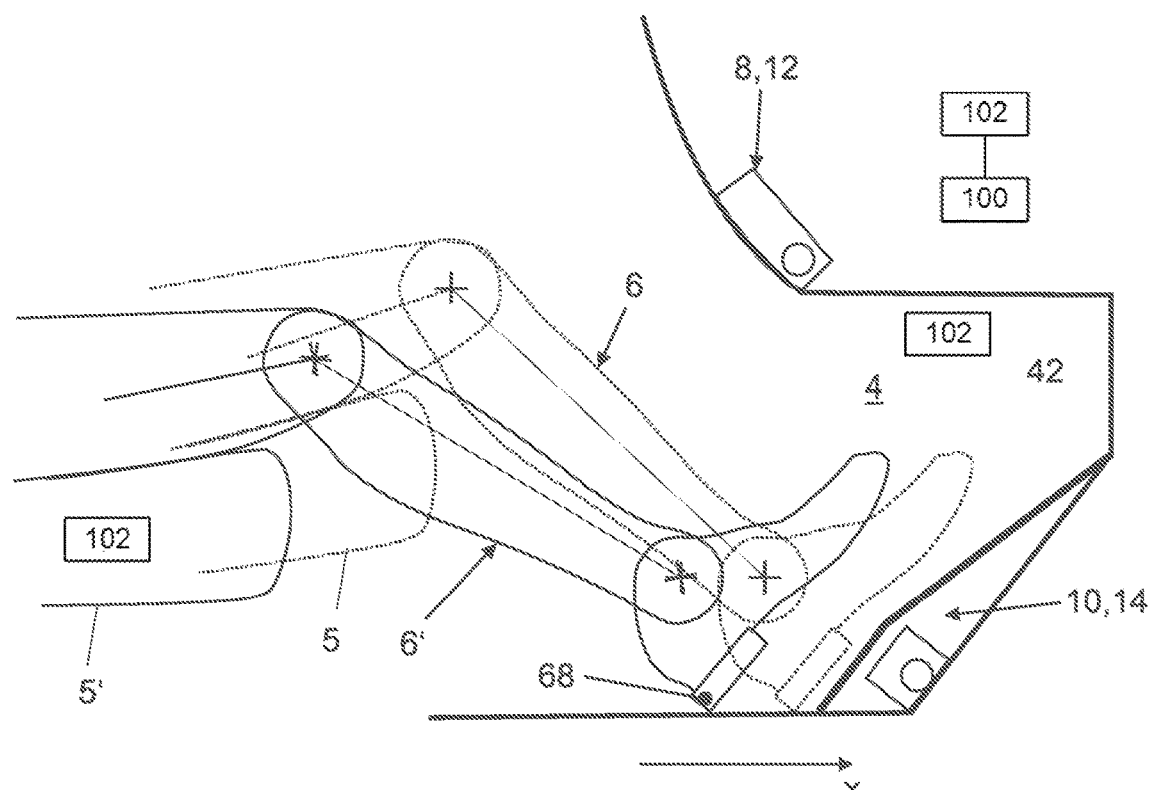
FIG. 5 shows a schematic view of the footwell with the vehicle occupant restraint system according to FIG. 1 with lower extremities of a 50%-person in a comfort position.

In FIG. 5, the lower extremities 6' of a 50%-person are shown who is seated in a vehicle seat 5' in a comfort position in which the vehicle seat 5' is shifted backwards compared to the standard position (vehicle seat 5—shown by a dotted line). As compared to the arrangement of the lower extremities 6 in the standard position (shown by a dotted line), the lower extremities 6' are arranged further behind in the comfort position.

Figure 6:
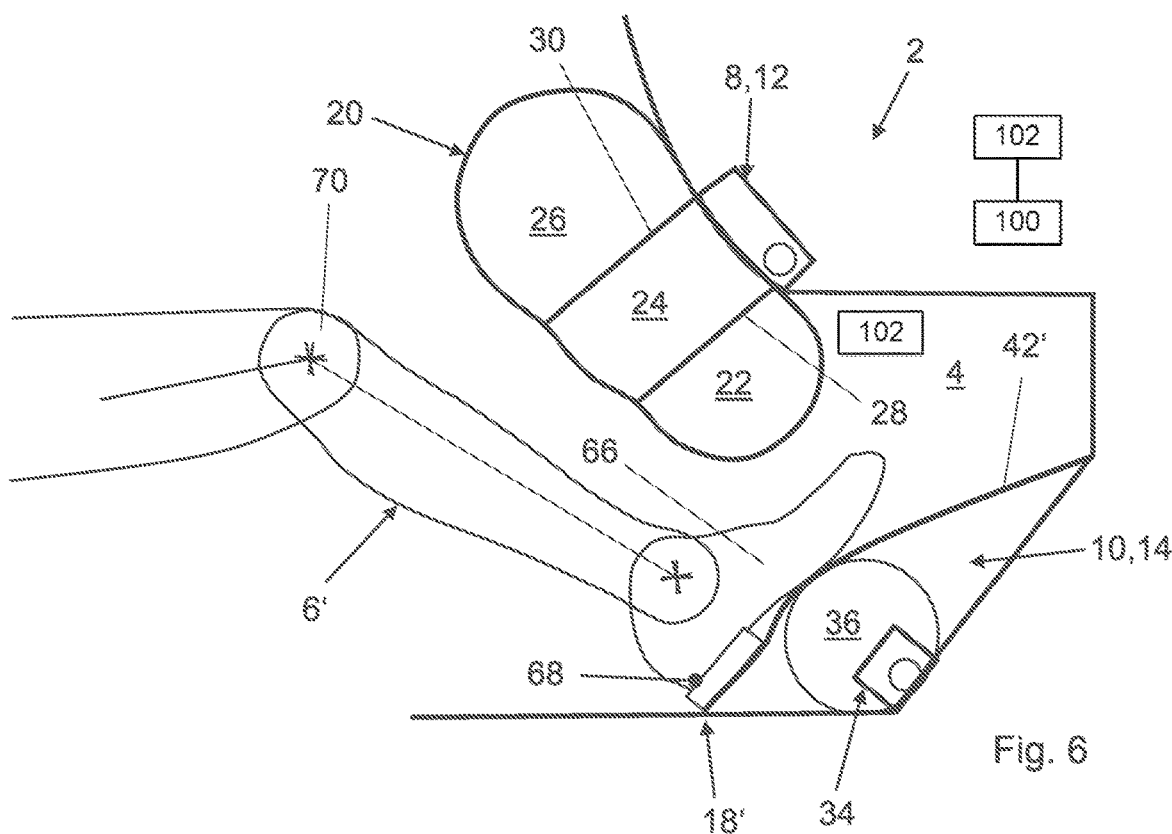
FIG. 6 shows a schematic view of the footwell with the vehicle occupant restraint system according to FIG. 5 in an activated state at a time t1 at which feet of the 50%-person impact on a heel abutting point positioning module.

FIG. 6 illustrates a situation of restraint for the lower extremities 6' of the 50%-person in the comfort position. FIG. 6 shows that, apart from the knee airbag module 12 of the first restraint element 8, also the airbag module 34 of the heel abutting point positioning module 14 of the second restraint element 10 was activated by the control unit 100. FIG. 6 illustrates the vehicle occupant restraint system 2 at a time t1 when the foot 66 impacts with the heel 68 on the heel abutting point 18' shifted backwards. Thus, the forward movement of the foot 66 is limited and, for example, the foot 66 and the shin 64 are prevented from swinging upwards.

Figure 7:
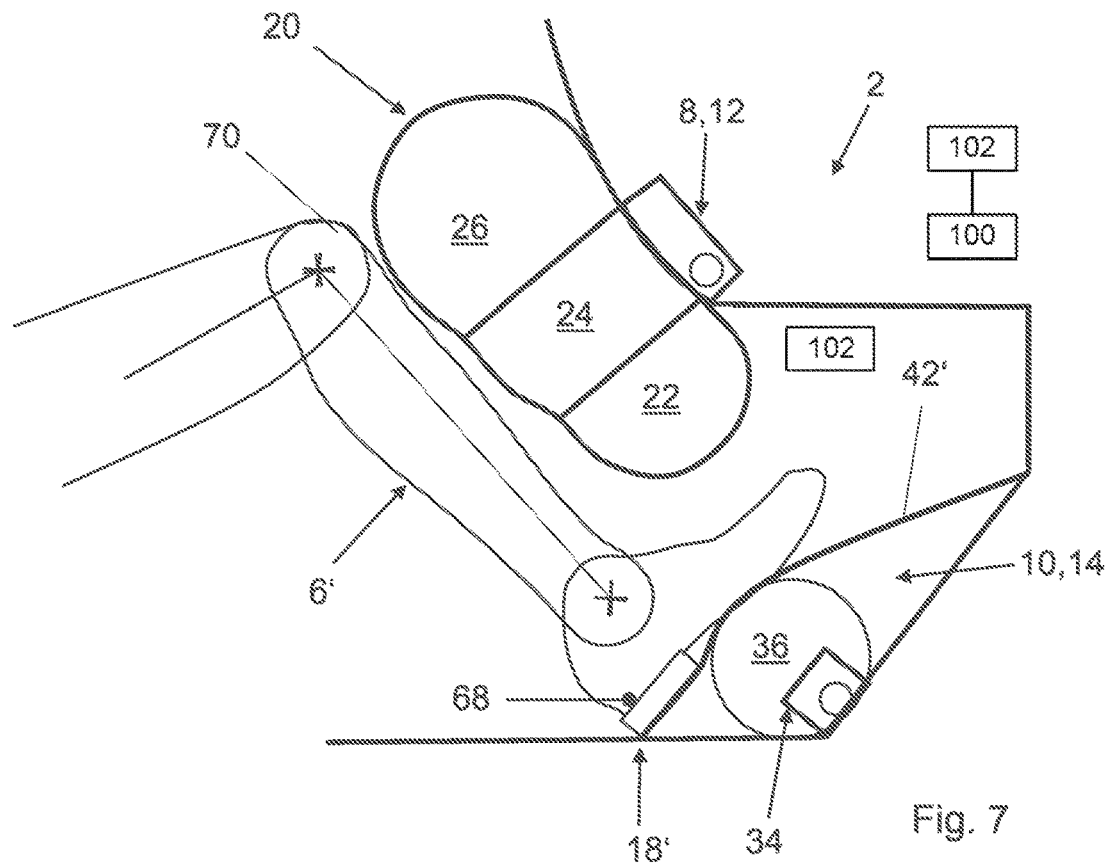
FIG. 7 shows a schematic view of the footwell with the vehicle occupant restraint system according to FIG. 5 in an activated state at a time t2 at which knees of the 50%-person impact on a knee airbag.

FIG. 7 illustrates the situation of restraint at a subsequent time t2 when the knee 70 and the shin 64 impact on the filled knee airbag 20. The protective effect of the knee airbag 12 for the lower extremities can be improved by limiting the forward movement of the foot 66 by the heel abutting point positioning module 14.

Figure 8:
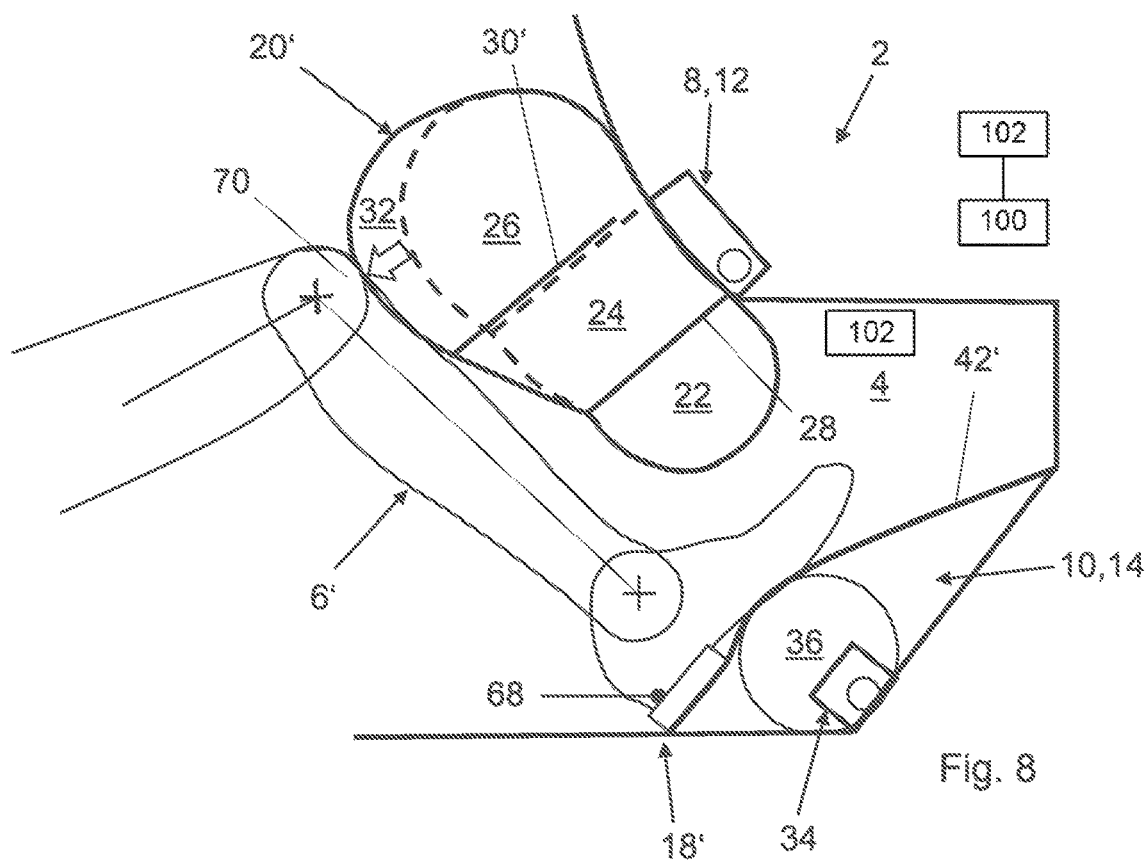
FIG. 8 shows a schematic view of the footwell with the vehicle occupant restraint system according to FIG. 5 in an activated state at a time t2 at which knees of the 50%-person impact on an alternative embodiment of the knee airbag.

FIG. 8 illustrates the vehicle occupant restraint system 2 equally at the time t2. The vehicle occupant restraint system 2 of FIG. 8 differs from the vehicle occupant restraint system 2 of FIG. 7 merely by the embodiment of the knee airbag module 12. In the knee airbag module 12 of FIG. 8, the knee airbag 20' includes a depth-adaptive chamber 32. The depth-adaptive chamber 32 is formed, in the shown example embodiment, by the tether 30' being released on one side in the area of the knee airbag module 12 by a release unit. In this way, in the area of the two upper chambers 24 and 26 the knee airbag 20' can expand further toward the lower extremities 6' of the vehicle occupant. The release unit for releasing the tether 30' is activated by the control unit 100.

Figure 9:
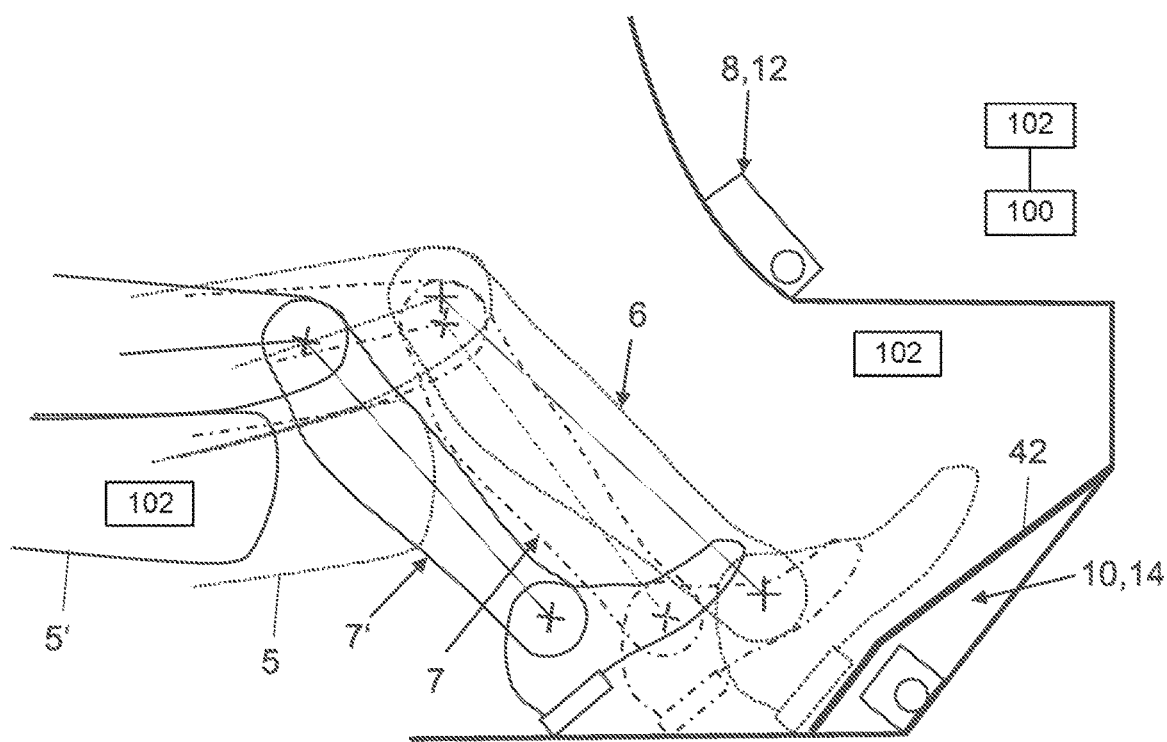
FIG. 9 shows a schematic view of the footwell with the vehicle occupant restraint system according to FIG. 1 with lower extremities of a 5%-person in a comfort position.

In FIG. 9, the lower extremities 7' of a 5%-person seated in a vehicle seat 5' in a comfort position are shown. In comparison with the arrangement of the lower extremities 6 of the 50%-person (shown by a dotted line) and lower extremities 7 of the 5%-person (shown by a dash-dot line) in the vehicle seat 5 in the standard position (shown by a dotted line), the lower extremities 7' are arranged still further behind in the comfort position.

Figure 10:
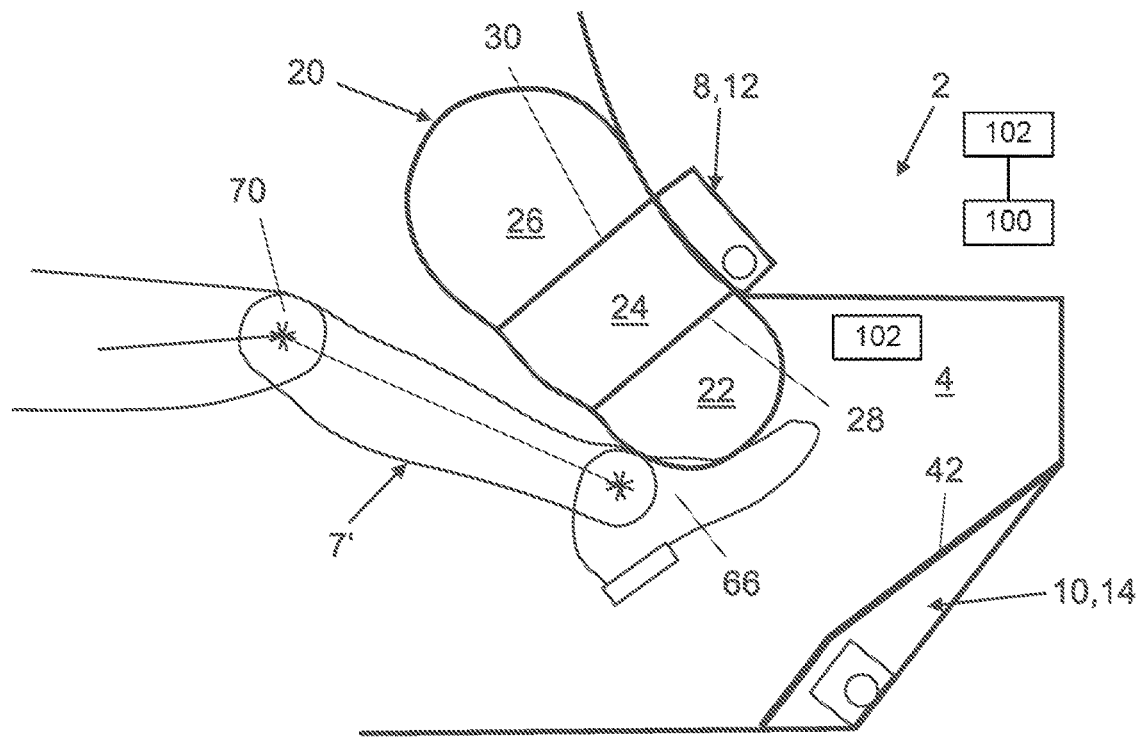
FIG. 10 shows a schematic view of the footwell with the vehicle occupant restraint system according to FIG. 9 in an activated state at a time t1 at which feet of the 5%-person impact on a low-pressure chamber of the knee airbag.

In FIG. 10 a situation of restraint for the lower extremities 7' of the 5%-person in the comfort position is illustrated. FIG. 10 shows the vehicle occupant restraint system 2 at a time t1 when the foot 66 impacts on the lowest chamber 22 of the knee airbag 20. The chamber 22 is configured as a low-pressure chamber 22 which, in a filled state or at least when the feet 66 impact on the knee airbag 20, has a lower internal pressure than the two further chambers 24 and 26 of the knee airbag.

In the illustrated embodiment, only the knee airbag module 12 of the first restraint element 8 is activated by the control unit 100. The heel abutting point positioning module 14 is not activated in the shown vehicle occupant restraint system 2. In the illustrated embodiment, the activation does not take place especially because it was determined by the control unit 100 that the heel abutting point 18' shifted backwards could not prevent the foot 66 and the shin 64 from swinging upwards.

Figure 11:
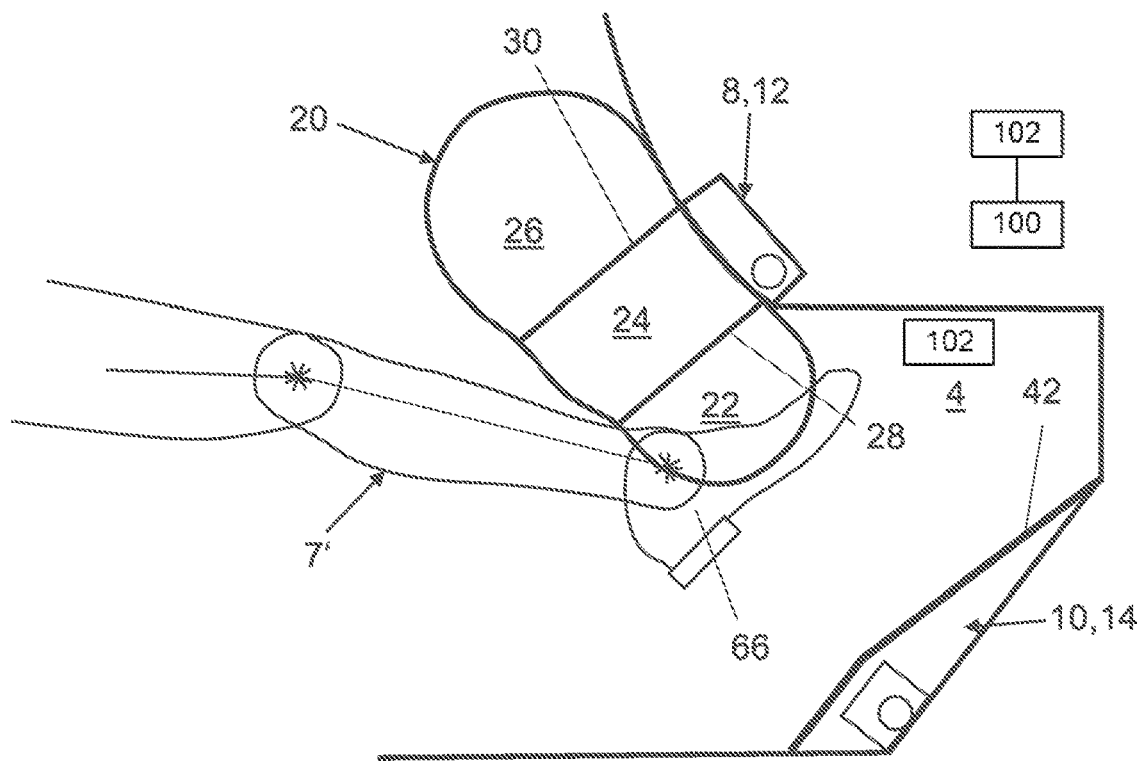
FIG. 11 shows a schematic view of the footwell with the vehicle occupant restraint system according to FIG. 9 in an activated state at a time t2, after feet of the 5%-person have impacted on the low-pressure chamber of the knee airbag.

FIG. 11 shows the restraint situation of FIG. 10 at a later point in time t2 when the feet 66 of the vehicle occupant have already impacted on the low-pressure chamber 22. The lower internal pressure of the low-pressure chamber 22 enable the feet 66 to "immerse" into the low-pressure chamber 22. Thus, rebounding of the feet 66 and the shins 64 can be prevented or at least weakened.

Figures 12, 13:
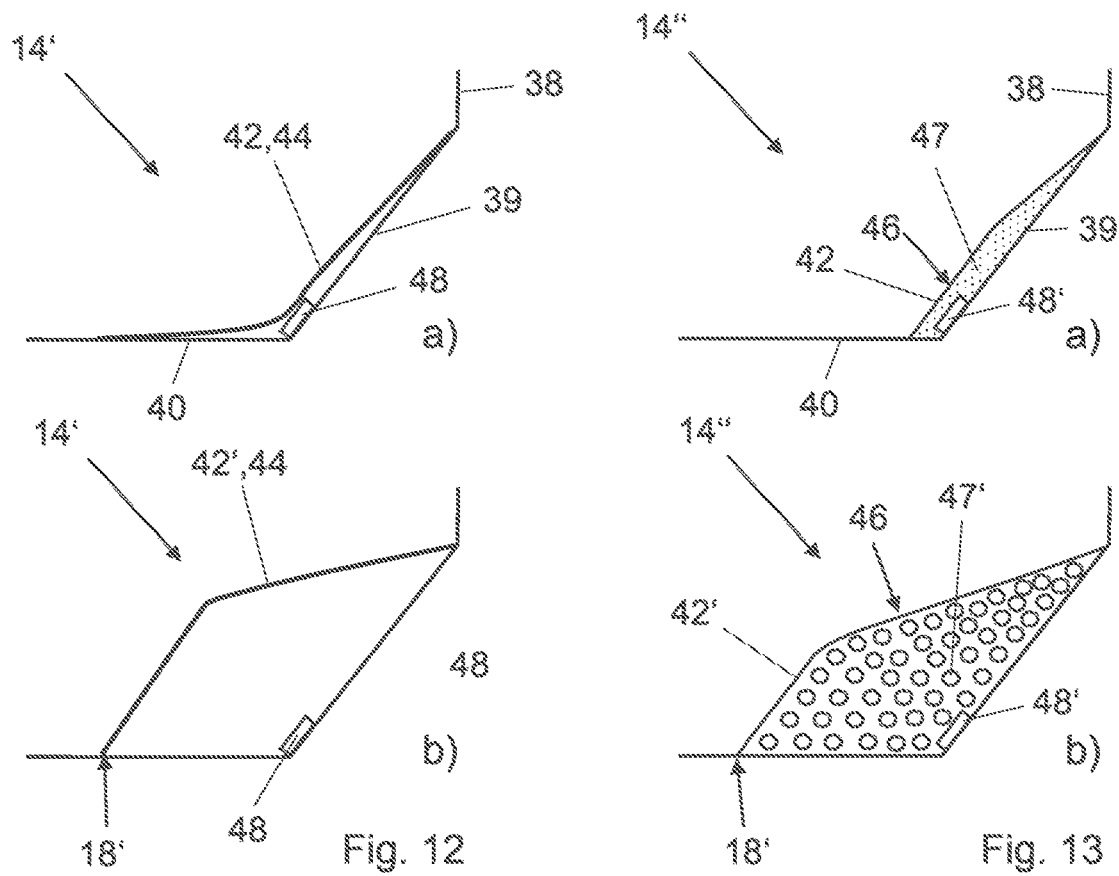
FIG. 12 shows a schematic view of an alternative embodiment of a heel abutting point positioning module in a) a non-activated state and b) an activated state.
FIG. 13 shows a schematic view of another alternative embodiment of a heel abutting point positioning module in a) a non-activated state and b) an activated state.

FIGS. 12 and 13 illustrate alternative embodiments of the heel abutting point positioning module 14' and 14". For the heel abutting point positioning modules 14' and 14" the shift of the heel abutting point 18 to the position marked with 18' is carried out via a deformation element.

In the heel abutting point positioning module 14' shown in FIG. 12 a) and b), the deformation element is configured as a bistable spring element 44. The bistable spring element is disposed beneath the vehicle floor lining 42 in the transition area 39 between the front wall 38 delimiting the footwell 4 and the vehicle floor 40.

The bistable spring element 44 can be excited by an actuator 48 to change its shape from the first stable position shown in FIG. 12 a) to a second stable position shown in FIG. 12 b).

In the heel abutting point positioning module 14" shown in FIG. 13 a) and b), the deformation element is represented as a foamable element 46. The foamable element 46 comprises a material 47 which can be foamed by excitation and thus increases its volume. The foamable element 46 is disposed beneath the vehicle floor lining 42 in the transition area 39 between the front wall 38 delimiting the footwell 4 and the vehicle floor 40.

Upon activation of the heel abutting point positioning module 14", the foaming process is started by the control unit 100 by an appropriate actuator 48'. The vehicle floor lining 42 is lifted by the foamed material 47' into the position marked with 42'. The heel abutting point 18 is shifted by the foamed material toward the vehicle occupant to the position marked with 18'. The vehicle floor lining 42 can be fixed at the shifted heel abutting point 18' on the vehicle floor 40 so as to obtain a defined shift of the heel abutting point 18 to the position marked with 18'.

Figure 14:
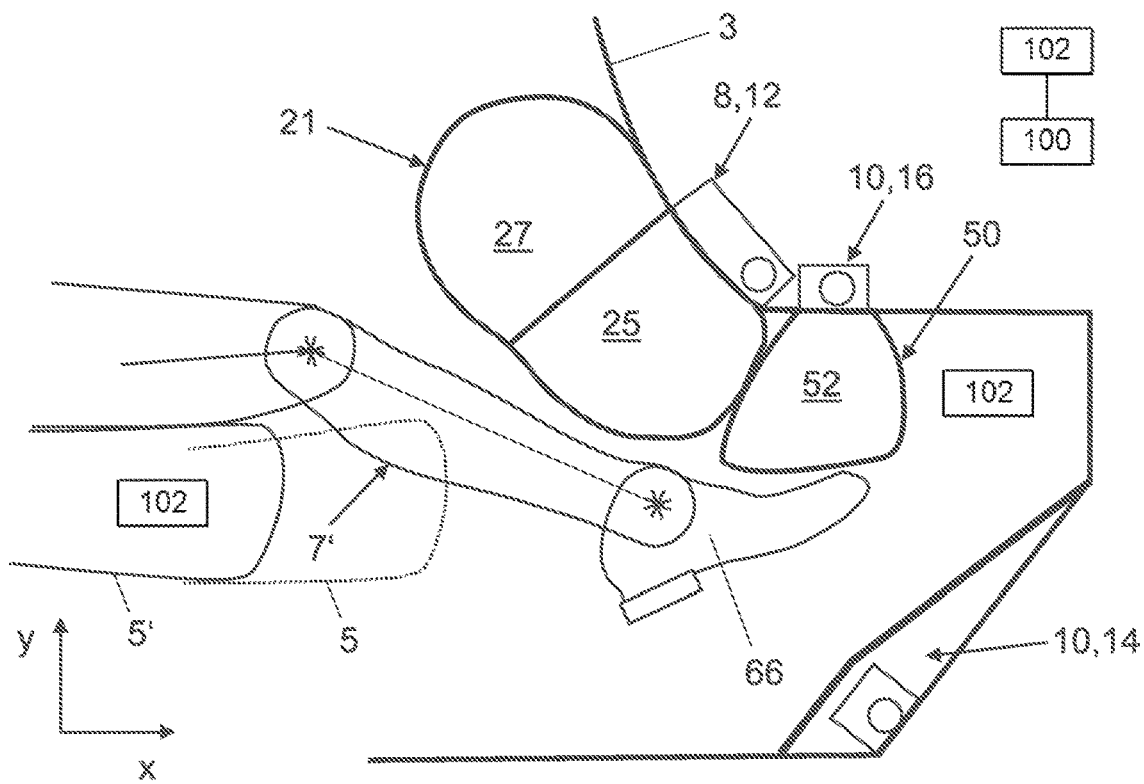
FIG. 14 shows a schematic view of the footwell of a vehicle with a second embodiment of a vehicle occupant restraint system according to the invention and lower extremities of a 5%-person in a comfort position in an activated state of the vehicle occupant restraint system at a time t1 immediately before feet of the 5%-person will impact on a foot airbag.
Figure 15:
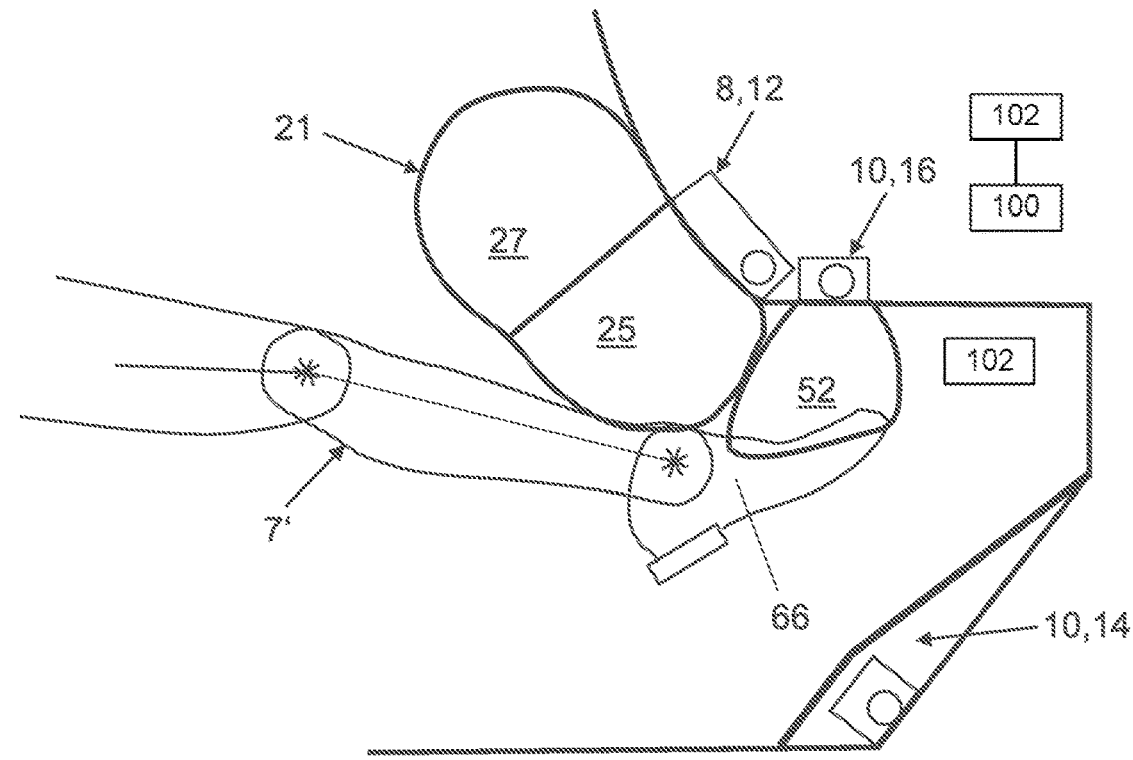
FIG. 15 shows a schematic view of the footwell with the vehicle occupant restraint system according to FIG. 14 at a time t2 after the feet of the 5%-person have impacted on the foot airbag.

FIGS. 14 and 15 illustrate another embodiment of the vehicle occupant restraint system 2 with the lower extremities 7' of a 5%-person in a vehicle seat 5' in a comfort position in which the vehicle seat 5' is shifted backwards. For the purpose of comparison, in FIG. 14 the vehicle seat 5 is additionally shown in dotted line in the standard position. The vehicle occupant restraint system 2 differs from the vehicle occupant protection system 2 of FIGS. 1 to 11 in that the knee airbag 21 of the knee airbag module 12 includes no low-pressure chamber. Moreover, the second restraint element 10 comprises a foot airbag module 16 in addition to the heel abutting point positioning module 14.

In the shown example embodiment, the control unit 100 has activated the knee airbag module 12 of the first restraint element 8 as well as the foot airbag module 16 of the second restraint element 10 for the given situation. FIG. 14 illustrates the situation of restraint at a time t1 immediately before the foot 66 impacts on a foot airbag 50. Further, FIG. 15 illustrates the situation of restraint at a time t2 after the foot 66 has impacted on and "immersed" into the foot airbag 50. In the further points, the shown situation of restraint corresponds to the situation of restraint shown in FIGS. 10 and 11.

The foot airbag 50 of the foot airbag module 16 is configured as a low-pressure chamber 52. The low-pressure chamber 52 in the filled state has a lower internal pressure than the chambers 25 and 27 of the knee airbag 21 of the knee airbag module 12 of the first restraint element 8.

In the installed state, the foot airbag module 16 is disposed in the lower area of the instrument panel 3 ahead of the knee airbag module 12 (relating to the vehicle vertical direction y and the vehicle longitudinal direction x).

In the shown example embodiment of FIGS. 14 and 15, the low-pressure chamber 52 of the foot airbag 50 substantially adopts the function of the pressure-adaptive low-pressure chamber 22 of the knee airbag 20 of the example embodiment shown in FIGS. 1 to 11.

In particular, also the low-pressure chamber 52 enables the feet 66, due to the lower internal pressure, to "immerse" into the low-pressure chamber 52. Thus, in this case rebounding of the feet 66 and of the shins 64 can equally be prevented or at least weakened.

The foot airbag module 16 in such embodiment of the vehicle occupant restraint system 2 is only activated, for example, if a 5%-person is seated in the vehicle seat in the comfort position.

Figure 16:
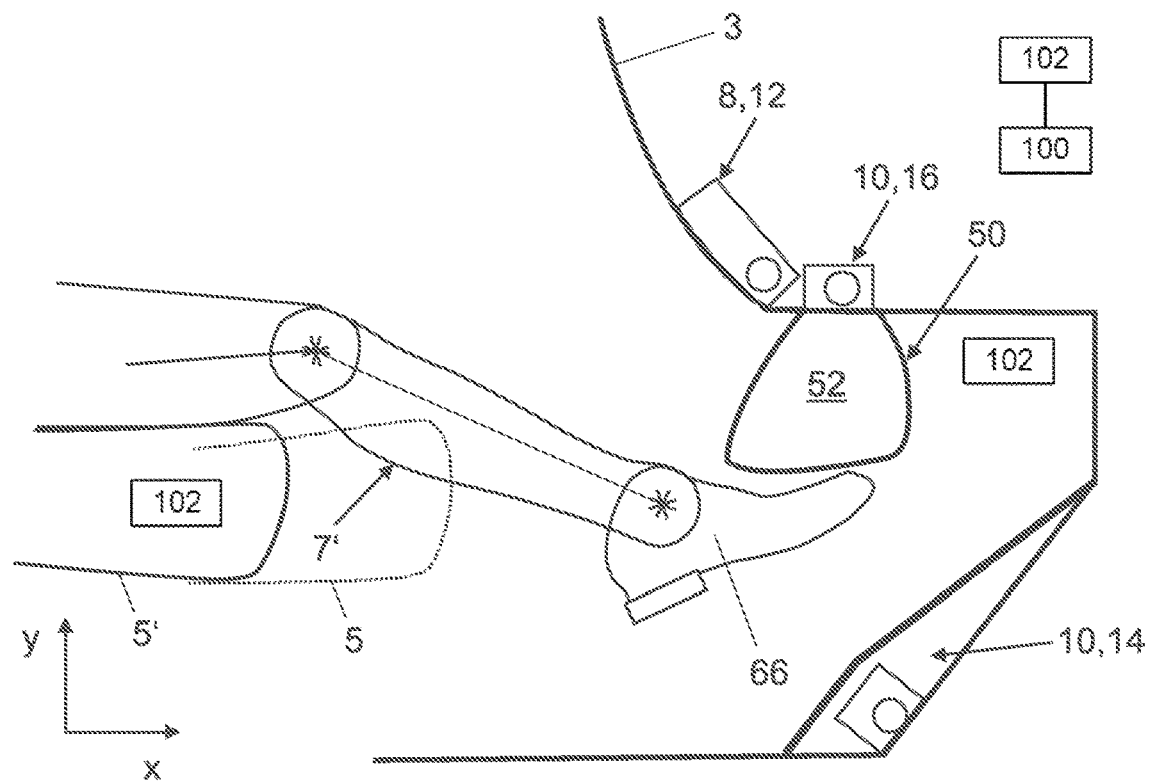
FIG. 16 shows a schematic view of the footwell with the vehicle occupant restraint system according to the invention of FIG. 14 with an alternative activation of the restraint elements by the control unit at a time t1 immediately before feet of the 5%-person will impact on a foot airbag.
Figure 17:
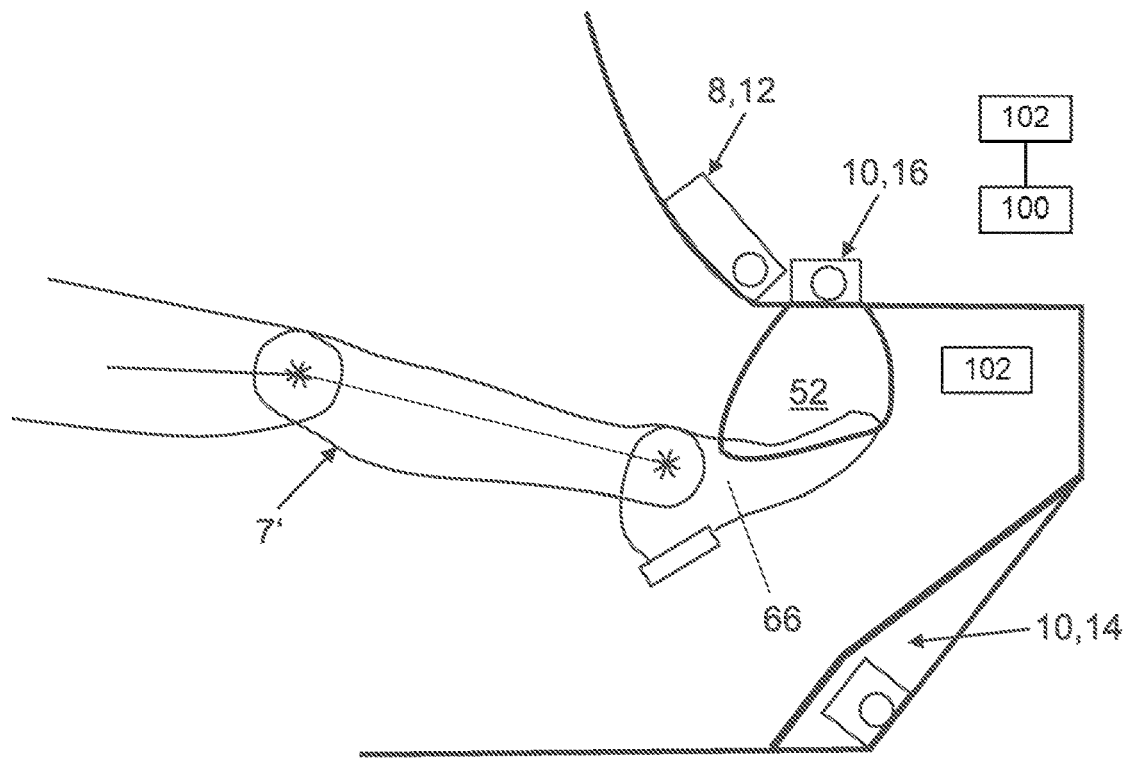
FIG. 17 shows a schematic view of the footwell with the vehicle occupant restraint system of FIG. 16 at a time t2 after the feet of the 5%-person have impacted on the foot airbag.

FIGS. 16 and 17 illustrate a vehicle occupant restraint system 2 with the lower extremities 7' of a 5%-person in a vehicle seat 5' in a comfort position which, as to its structure, corresponds to the vehicle occupant restraint system 2 of the FIGS. 14 and 15. In the comfort position, the vehicle seat 5' is shifted backwards as compared to the vehicle seat 5 in the standard position (shown in dotted line).

The vehicle occupant restraint system 2 of FIGS. 16 and 17 differs from the vehicle occupant restraint system 2 of FIGS. 14 and 15 by an alternative activation of the restraint elements in a situation of restraint, when a particular situation is given.

The particular situation is given if it is detected by the control unit 100 that the vehicle seat 5 is in a position shifted backwards, especially in a comfort position, and the vehicle occupant is a short and/or light person, especially a 5%-person.

When said particular situation is given, only the foot airbag module 16 of the second restraint element 10 is activated by the control unit 100. In the further possible situations in which the vehicle seat is in a standard position and/or in the vehicle seat a person is seated who is taller and/or heavier than a 5%-person, at least the knee airbag module 12 of the first restraint element 8 is activated by the control unit 100. Depending on the situation, moreover the foot airbag module 16 and/or the heel abutting point positioning module 14 of the second restraint element 10 can be activated by the control unit 100.

What is claimed is:

1. A vehicle occupant restraint system comprising a control unit and at least two restraint elements for the protection of lower extremities in the area of a footwell of a vehicle of a vehicle occupant seated in a particular vehicle seat of the vehicle,
   wherein a first restraint element is in the form of a knee airbag module,
   wherein a second restraint element is provided for mounting into the footwell of the vehicle in an area of the footwell of the vehicle arranged in the vehicle longitudinal direction ahead of the knee airbag module,
   wherein the second restraint element comprises at least one foot airbag module including a foot airbag,
   wherein the control unit can differentiate, in a situation of restraint, between different given situations, the given situation being determinable via a vehicle seat position and parameters relating to vehicle occupants,
   wherein the control unit in the situation of restraint, when a situation is given in which the vehicle occupant is a short and/or light person and the vehicle seat is in a position shifted backwards, in a position shifted backwards compared to a standard position, only activates the foot airbag module of the second restraint element.

2. The vehicle occupant restraint system according to claim 1, wherein, in a situation in which the vehicle seat is in the standard position and/or the vehicle occupant is not a short and/or light person, in the situation of restraint at least the knee airbag module of the first restraint element is activated by the control unit, wherein the control unit can additionally activate, depending on the given situation, the second restraint element or a partial element of the second restraint element.

3. The vehicle occupant restraint system according to claim 1, wherein the second restraint element comprises a heel abutting point positioning module.

4. The vehicle occupant restraint system according claim 1, wherein the foot airbag of the foot airbag module comprises a low-pressure chamber or is configured as a low-pressure chamber.

5. The vehicle occupant restraint system according claim 1, wherein the knee airbag module comprises a knee airbag with at least one adaptive chamber.

6. The vehicle occupant restraint system according to claim 5, wherein the adaptive chamber of the knee airbag can be activated and/or controlled through the control unit.

7. The vehicle occupant restraint system according claim 1, wherein a knee airbag of the knee airbag module comprises a pressure-adaptive chamber.

8. The vehicle occupant restraint system according to claim 7, wherein the pressure-adaptive chamber of the knee airbag is in the form of a low-pressure chamber.

9. The vehicle occupant restraint system according claim 1, wherein a knee airbag of the knee airbag module comprises a depth-adaptive chamber.

10. The vehicle occupant restraint system according claim 3, wherein the heel abutting point positioning module comprises an airbag module.

11. The vehicle occupant restraint system according claim 3, wherein the heel abutting point positioning module comprises a deformation element.

12. The vehicle occupant restraint system according to claim 11, wherein the deformation element comprises a bistable spring element.

13. The vehicle occupant restraint system according to claim 11, wherein the deformation element comprises a foamable element.

14. The vehicle occupant restraint system according claim 1, comprising at least one sensor element for detecting the given situation.

15. The vehicle occupant restraint system according to claim 14, wherein the sensor element comprises a camera system and/or sensors disposed and/or integrated in vehicle seat elements and/or in the footwell.

16. A method for operating a vehicle occupant restraint system according claim 1, said method comprising the following steps of:
   detecting and determining a position of the vehicle seat and/or parameters relating to vehicle occupants in a situation of restraint;
   determining the given situation by the control unit;
   activating the restraint elements and/or partial elements of the restraint elements required for the restraint in the given situation.

17. The method for operating a vehicle occupant restraint system according to claim 16, wherein, when detecting the parameters relating to vehicle occupants, a body weight and/or a body height and/or a position of the vehicle occupant in the vehicle seat is/are determined.

* * * * *